United States Patent Office 3,838,069
Patented Sept. 24, 1974

3,838,069
CATALYST FOR USE IN PURIFICATION OF EXHAUST GAS CONTAINING CARBON MONOXIDE
Kazuhide Miyazaki, Tanashi, Michiaki Yamamoto, Fuchu, Shigehiko Kobayashi, Tokyo, and Toshiyuki Sakai, Funabashi, Japan, assignors to Mitsui Mining and Smelting Co., Ltd., Tokyo, Japan
No Drawing. Filed July 27, 1971, Ser. No. 166,558
Claims priority, application Japan, Sept. 29, 1970, 45/84,646; Oct. 14, 1970, 45/90,231
Int. Cl. B01j *11/06, 11/32*
U.S. Cl. 252—456                           6 Claims

ABSTRACT OF THE DISCLOSURE

A catalyst consisting of manganese oxides and lead oxides or one consisting of manganese oxides and bismuth oxides is suitable for the oxidation and purification of exhaust gas containing carbon monoxide, and a catalyst consisting of the mixture of manganese oxides and lead oxides together with metals of such transition elements as copper, iron, cobalt, nickel, etc. or bismuth oxides or the like added thereto and a catalyst consisting of the mixture of manganese oxides and bismuth oxides together with oxides of such alkaline earth elements as magnesium, calcium or barium, oxides of such rare earth elements as yttrium, lanthanum, cerium or neodymium, oxides of aluminum or silicon, oxides of such transition metals as copper, iron, cobalt or nickel, or some transition metals such as copper, iron, cobalt, nickel, etc. added thereto are more suitable for the oxidation and purification of exhaust gas containing carbon monoxide.

BACKGROUND OF THE INVENTION (a) Field of the invention

The present invention relates to a catalyst for use in the oxidation and purification of exhaust gas containing carbon monoxide, which consists of manganese oxides and one member selected from the group consisting of lead oxides and bismuth oxides, and preferably a catalyst for said use consisting of a mixture of manganese oxides and lead oxides together with some bismuth oxides, or transition metals such as copper, iron, cobalt, nickel, etc. added thereto and a catalyst for said use consisting of the mixture of manganese oxides and bismuth oxides together with oxides of such alkaline earth elements as magnesium, calcium or barium, oxides of such rare earth elements as yttrium, lanthanum, cerium or neodymium, oxides of aluminum or silicon, oxides of such transition metals as copper, iron, cobalt, nickel, etc. or transition metals such as copper, iron, cobalt, nickel, etc. added thereto.

(b) Description of the prior art

The carbon monoxide exhausted in large quantities from the gasoline engines of automobiles, and the like has become a cause of grave environmental pollution, but no effective means of overcoming this problem radically has so far been found. Generation of waste gas containing carbon monoxide is attributable not only to the gasoline engines of automobiles but also to the internal combustion engines in use for aircraft, construction machinery and so on, the chimneys of factories as well as the incomplete combustion of fuel in kerosene stoves and gas stoves.

As the means of oxidizing carbon monoxide in the prior art, there have been reported instances of utilization of a manganese oxide and the like as the oxidizing agent for use in a gas mask, but there is no other precedent for utilization of this material as an oxidizing agent. Besides, said conventional oxidizing agent is practically ineffective when used in coping with treating a high-temperature waste gas such as the ones exhausted from automobiles or other gasoline engines and under conditions of intermittent use such as in the automobile applications.

One object of the present invention is to provide a catalyst suitable for use in purification of exhaust gas by converting mainly carbon monoxide contained therein into harmless carbon dioxide gas by catalytic oxidation.

Another object of the present invention is to provide a catalyst suitable for use in oxidation and purification of a high-temperature exhaust gas containing carbon monoxide.

Still another object of the present invention is to provide a catalyst for use in purification of exhaust gas, which is durable in prolonged use.

A further object of the present invention is to provide an oxidizing catalyst which is effective in facilitating the combustion, which gives rise to very little carbon monoxide content in the exhaust gas.

SUMMARY OF THE INVENTION

The present inventors have conducted a series of researches on the durability of catalysts in oxidation and purification at high temperature such as in the case of purification of the exhaust gases from gasoline engines and come to the finding that manganese oxides mixed with lead oxides or the same mixed with bismuth oxides manifest a pre-eminent efficiency in oxidizing and purifying carbon monoxide and hydrocarbons. They have also come to the finding that a catalyst composed of the foregoing mixtures of manganese oxides and lead oxides together with at least one member selected from the group consisting of such transition metals as copper, iron, cobalt, nickel, etc. and bismuth oxides added thereto and a catalyst composed of the foregoing mixtures of manganese oxides and bismuth oxides together with at least one member selected from the group consisting of oxides of such alkaline earth elements as magnesium, calcium or barium, oxides of such rare earth elements as yttrium, lanthanum, cerium or neodymium, oxides of aluminum or silicon, oxides of such transition metals as copper, iron, cobalt, nickel, etc. or such transition metals as copper, iron, cobalt, nickel, etc. added thereto are much more effective in oxidation and purification of carbon monoxide. It goes without saying that these catalysts are capable of effecting said oxidation of carbon monoxide and hydrocarbons satisfactorily even when the temperature is not high. The present invention has been accomplished on the basis of the above findings.

It is construed that the reaction mechanism taking place when the catalyst under the present invention comes in contact with exhaust gas generally follows the hereunder modeled reaction processes.

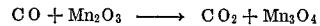
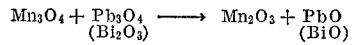
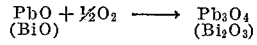
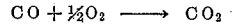
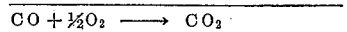

In other words, a catalyst mainly consisting of manganese oxides and lead oxides improves drastically the oxidation function of manganese oxides up to quite a high efficiency by making the best use of the chemical characteristics that lead oxides are firmly equilibrated directly with oxygen at a relatively high temperature, and also to maintain the thus improved efficiency continuously, to thereby work as the catalyst as if the carbon monoxide is strongly oxidized directly by oxygen in the air, and further the oxidizability of the catalyst for use in purification is enhanced by virtue of the addition of the foregoing additives to this mixture of manganese oxides and lead oxides.

Also in case of a catalyst mainly consisting of manganese oxides and bismuth oxides, there is observed a phenomenon almost the same as in the aforementioned case of manganese oxides and lead oxides, and the performance of the catalyst for use in purification is also enhanced by virtue of the addition of the foregoing additives to this mixture of manganese oxides and bismuth oxides.

As may be understood from the above description, lead oxides and bismuth oxides can be employed for composing the catalyst of the present invention not only individually but also jointly at the same time.

In case the catalyst under the present invention is a uniform mixture of manganese oxides and lead oxides, the applicable mixing ratio of said manganese oxides and lead oxides is in the range of 75:25–25:75 by wt. percent—preferably 60:40–40:60 by wt. percent—and the applicable mixing ratio of the aforementioned additives (namely, at least one member selected from the group consisting of such transition metals as copper, iron, cobalt, nickel, etc. and bismuth oxides) to this mixture of manganese oxides and lead oxides is in the range of 5–40 wt. percent—preferably 5–30 wt. percent—to the total amount of manganese oxides and lead oxides. If the mixing ratio deviates from the above ranges, the efficiency of the present invention will not be fully demonstrated.

In case the catalyst under the present invention is a uniform mixture of manganese oxides and bismuth oxides, the applicable mixing ratio of said manganese oxides and bismuth oxides is in the range of 95:5–50:50 by wt. percent—preferably 90:10–70:30 by wt. percent—and the applicable mixing ratio of the aforementioned additives to this mixture of manganese oxides and bismuth oxides is in the range of 5–10 by wt. percent—preferably 7–8 by wt. percent—to the total amount of manganese oxides and bismuth oxides when said additive is at least one member selected from the group consisting of oxides of alkaline earth elements, oxides of rare earth elements, aluminum oxides, silicon oxides and oxides of transition metals, while it is in the range of 5–60 by wt. percent—preferably 10–30 by wt. percent—to the same when said additive is at least one member of the group of transition metals. If the mixing ratio deviates from the above ranges, the efficiency of the present invention will not be fully demonstrated.

The effect of the addition of the foregoing additives to the mixture of manganese oxides and lead oxides or the mixture of manganese oxides and bismuth oxides is yet to be theoretically clarified, but, as a matter of fact, the duration of the exhaust gas purification ability is enhanced by said addition, and in case of a catalyst containing the transition metal, the temperature at which the catalyst begins working gets lowered by 50–70° C.

Manganese oxide species applicable in the present invention include such oxides as $Mn_2O_3$, $Mn_3O_4$, $MnO_2$ known as electrolytic manganese dioxide, chemical manganese dioxide or natural manganese dioxide, etc. Lead oxide species applicable in the present invention include such oxides as $PbO$, $Pb_3O_4$, $PbO_2$, $Pb_2O_3$, etc. Bismuth oxide species applicable in the present invention include such oxides as $Bi_2O_3$, $Bi_2O_4$, $nH_2O$, $Bi_2O_5$, $Bi_2O_5 \cdot H_2O$, etc. These oxides species are not necessarily used jointly in a single catalyst.

The results of a series of tests have proved that the catalyst according to the present invention is capable of well oxidizing CO in the amount of about 1000 times as much as the chemical equivalent of the catalyst employed. For instance, even the exhaust gas arising from the idling of automobile engine which is as high as above 5% in CO concentration—the highest of this kind of exhaust gas—can be instantly and drastically abated of its CO concentration by the use of a trifling amount of the present catalyst. This is attributable to the fact that the present catalyst for use in purification is capable of very effective catalytic performance and the oxidizability of this catalyst is well maintained as shown by the foregoing modeled reaction processes.

Inasmuch the present catalyst for use in purification is capable of catalytic action as above, it is capable of dealing with exhaust gas in large quantities over a long period of time. Besides, while catalysts in general are extremely sensitive to humidity, the present catalyst is durable in prolonged use without any adjustment of humidity in the atmosphere. Not only that, while the catalytic efficiency of general catalysts is apt to fast deteriorate when subjected to a high temperature, the present catalyst for use in purification is well proof against a high temperature so that it is suitable for uses widely in the oxidation of carbon monoxide and hydrocarbons in the exhaust gas from the gasoline engines of automobiles and the like with which the conventional catalysts available on the market have failed to cope.

In case of furnishing a practical apparatus with the present catalyst for use in purification, employment of a very small amount of said catalyst suffices, and the design of the apparatus for this purpose, the way of mounting the catalyst on the apparatus and use thereof are very simple and economical. As for the method of installing of the present catalyst, there are various ways such as packing the catalyst fabricated in various shapes into the exhaust pipe-line, upholding the catalyst pieces inside the exhaust pipe-line by virtue of various binders, etc. Referring to the shaping of the catalyst for the sake of said mounting, various means, such as follows, can be employed as occasion demands: hot-pressing of the catalyst; making pulverized catalyst adhere to optional supporting substrate by means of binders; like butoxytitanate, tetraetoxysilane, etc. pelletizing of the catalyst through kneading thereof upon adding manganese compounds solution, lead compounds solution, bismuth compounds solution, or a blended solution of these compounds thereto depending on the principal component of the catalyst; application of a mixture prepared by mixing an appropriate amount of pulverized catalyst with a heat resisting paint onto optional supporting substrate; etc.

DESCRIPTION OF THE PREFERRED EMBODIMENTS

Example 1

Hereunder described are three kinds of tests of the present invention wherein electrolytic manganese dioxide ($MnO_2$) selected as manganese oxides and bismuth sesquioxide ($Bi_2O_3$) selected as bismuth oxides were applied in various combination.

Exhaust gas from a gasoline engine using leaded gasoline having the composition shown in Table 1 was made to pass through a pipe having a bore of 23 mm. at the rate of 600, cc./min. while maintaining the temperature of said exhaust gas in the range of 350–500° C. Inside the pipe, there was a catalyst bed of 5 gr. in the form of pellet having the diameter of 6 mm. and thickness of 3 mm. or thereabout in such a fashion as will bring about little resistance to the exhaust gas passing therethrough. The condition for treatment was such that said exhaust gas was subjected to intermittent passing through the pipe or 8 consecutive hours per day to be followed by 16-hour break and subsequent repetition of the passing of exhaust gas as above, and CO concentration at both the inlet and outlet of the catalyst bed was analyzed by means of gas chromatography. Tests in the present example were conducted by employing the exhaust gas having a high CO concentration of 5% exhausted from a gasoline engine using leaded gasoline as the sample of exhaust gas to be treated. The efficiency of the present catalyst was compared with a commercially available CO oxidizing agent on the basis of the duration to maintain the outlet CO concentration under 2%.

The purification efficiency of the present catalyst for use in purification with respect to CO in this case provide improvement by more than 900% compared with the oxidizers known heretofore, as shown in Table 1.

TABLE 1.—RESULTS OF TESTS OF CO PURIFICATION

Composition of sample inlet gas: CO 5%, $O_2$ 5%, $N_2$ 75%, $CO_2$ 19%, HC and others 5% (leaded gasoline was used)

| Kind of treating agent | Composition (wt. percent) | | Duration of servability (hrs.) | CO concentration of outlet gases classified by duration of service of treating agent | | | | | | | |
|---|---|---|---|---|---|---|---|---|---|---|---|
| | Mn— dioxide | Bi—sesqui- oxide | | 1 hr. | 5 hrs. | 10 hrs. | 20 hrs. | 50 hrs. | 100 hrs. | 150 hrs. | 200 hrs. |
| Catalysts for use in purification under present invention: | | | | | | | | | | | |
| 1 | 100 | 10 | >200 | 0.2 | 0.3 | 0.3 | 0.3 | 0.5 | 0.5 | 1.0 | 1.2 |
| 2 | 100 | 30 | >200 | 0.1 | 0.1 | 0.2 | 0.2 | 0.3 | 0.4 | 0.7 | 1.0 |
| 3 | 100 | 50 | >200 | 0.2 | 0.2 | 0.4 | 0.5 | 0.5 | 0.9 | 1.1 | 1.3 |
| Comparative oxidizers: | | | | | | | | | | | |
| 4 | Electrolytic $MnO_2$ | | 10 | 1.0 | 1.5 | 2.0 | | | | | |
| 5 | Conventional CO oxidizer | | 22 | 1.0 | 1.2 | 1.4 | 1.99 | | | | |

In addition to the above results, the concentration of hydrocarbons (HC) was also analyzed in terms of n-hexane by means of a non-dispersive infrared ray analyzer, and the present catalysts showed a high HC purification efficiency of more than 90%, while the comparative oxidizers showed little effect in said purification.

Example 2

Hereunder described are seven kinds of tests of the present invention wherein electrolytic manganese dioxide ($MnO_2$) selected as manganese oxides and bismuth sesquioxide ($Bi_2O_3$) selected as bismuth oxides were applied in combination upon adding thereto metallic copper powder (Cu) and metallic iron powder (Fe) as the additional metallic elements.

Exhaust gas from a gasoline engine using leaded gasoline having the composition shown in Table 2 was made to pass through a pipe having the bore of 50 mm. at the rate of 100 l./min. while maintaining the temperature of said exhaust gas in the range of 300–500° C. Inside the pipe, there was a catalyst bed of 250 gr. in the form of pellet, which was prepared by coating the mixture of a special thermostable adhesive and catalysts of the present invention on silicon carbide (SiC) carriers molded into 4 mm. in diameter and 4 mm. in thickness or thereabout, drying the carriers thus coated and then calcining them at a temperature in the range of 400–500° C. The space velocity in this case was 40,000/hr. The condition for treatment of the inlet gas was the same as in Example 1, and the concentrations of CO and hydrocarbons (HC) at both the inlet and outlet of the catalyst bed were analyzed by means of a non-dispersive infrared (NDIR) analyzer. As the sample of exhaust gas to be treated, the exhaust gas from a gasoline engine using leaded gasoline was used, which CO concentration was 5% and HC concentration was 500 p.p.m. in terms of n-hexane. As the efficiency of the present catalyst, the duration to maintain the outlet CO concentration below 2% and the duration to maintain HC purification efficiency more than 90%.

The method of purifying exhaust gas by use of the present catalyst proves to have an improved purification efficiency which is as high as more than 80% of that of the conventional oxidizer.

Example 3

Hereunder described are four kinds of tests of the present invention wherein electrolytic manganese dioxide ($MnO_2$) selected as manganese oxides and trilead tetroxide ($Pb_3O_4$) selected as lead oxides were applied upon combining therewith powders of metallic copper (Cu), metallic iron (Fe) and bismuth sesquioxide ($Bi_2O_3$) as third additives.

Exhaust gas having the composition shown in Table 3 from a gasoline engine using leaded gasoline was made to pass through a pipe having the bore of 50 mm. at the rate of 100 l./min. while maintaining the temperature of said exhaust gas in the range of 400–500° C. Inside the pipe, there was a catalyst bed of 250 gr. of the catalyst of the present invention fabricated into pellets of 6 mm. in diameter and 5 mm. in thickness or thereabout. The space velocity in this case was on the order of 40,000/hr. The condition for treatment of the exhaust gas was the same as in Example 3, and the concentration of CO and the concentration of hydrocarbons (HC) in terms of n-hexane at both the inlet and outlet of the catalyst bed were analyzed by means of a non-dispersive infrared ray (NDIR) analyzer. Tests in the present example were conducted by employing the exhaust gas having CO concentration of 5% and HC concentration of 500 p.p.m. in terms of n-hexane which was exhausted from a gasoline engine using leaded gasoline as the sample of exhaust gas to be treated, and confirming the efficiency of the present catalyst through measurement of the duration of servability to maintain the outlet CO concentration less than 2% and the duration of servability until the HC purification efficiency be lowered to 50%.

As is clear from the above description as well as Table 3 in this example showing the results of purification tests, the purification effect of the present catalyst for use in purification of exhaust gas containing CO is not confined to the purification of CO: it demonstrates an excellent purification efficiency also with respect to HC. The composition of the present catalyst for use in purification consists of mixtures of manganese oxides, lead oxides and transition metals or bismuth oxides added as third additives to said mixture. And, the method of purifying exhaust gas by use of the present catalysts proves to have an improved purification efficiency with respect to CO

TABLE 2.—RESULTS OF TESTS OF CO AND HC PURIFICATION

Composition of sample inlet gas: CO 5%, $O_2$ 5%, $N_2$ 78%, $CO_2$ 9%, HC 500 p.p.m., others 3% (leaded gasoline was used)—[Composition of catalysts for use in purification according to the present invention—Mn oxides: Bi oxides: additional metal element=80:20:(10–60) (by wt. percent)

| Kind of treating agent | Additional metal element | Duration of servability (hrs.) | CO concentration of outlet gas classified by duration of service of treating agent (percent) | | | | | | Duration of servability (hrs.) | HC concentration of outlet gas classified by duration of service of treating agent (p.p.m.) (in terms of n-hexane)] | | | | | |
|---|---|---|---|---|---|---|---|---|---|---|---|---|---|---|---|
| | | | 10 hrs. | 50 hrs. | 100 hrs. | 200 hrs. | 300 hrs. | 400 hrs. | | 10 hrs. | 50 hrs. | 100 hrs. | 200 hrs. | 300 hrs. | 400 hrs. |
| Catalysts for use in purification under present invention: | | | | | | | | | | | | | | | |
| 1 | None | 0 | >400 | 0 | 0 | 0 | 0.1 | 0.5 | >400 | 25 | 30 | 30 | 40 | 45 | 45 |
| 2 | Cu powder | *20 | >400 | 0 | 0 | 0 | 0 | 0.2 | >400 | 20 | 20 | 20 | 20 | 20 | 30 |
| 3 | Fe powder | *60 | >400 | 0 | 0 | 0 | 0.0 | 3 | >400 | 20 | 20 | 20 | 20 | 25 | 30 |
| Conventional CO oxidizer | | | 50 | 1.0 | 2.0 | | | | | 20 | 30 | 245 | | | |

*Wt. percent to the total wt. of manganese oxides and lead oxides.

and HC, which is as high as more than 600% of that of the conventional oxidizers employed as a control.

bed intermittently for 10 consecutive hours per day to be followed by 14-hour break and subsequent repetition

TABLE 3.—RESULTS OF TESTS OF CO AND HC PURIFICATION

Composition of sample exhaust gas: CO 5%, $O_2$ 5%, $N_2$ 78%, $CO_2$ 9%, HC 500 p.p.m., others 3% (leaded gasoline was used)—[Composition of catalyst for use in purification under the present invention—Mn oxides: Pb oxides: 3d additive=50:50:(10–30) (by wt. percent)]

| Kind of treating agent | 3d additive | | Duration of serv-ability (hrs.) | CO concentration of outlet gas classified by duration of service of treating agent (percent) | | | | | | Duration of serva-bility (hrs.) | HC concentration of outlet gas classified by duration of service of treating agent (p.p.m.) (in terms of n-hexane) | | | | | |
|---|---|---|---|---|---|---|---|---|---|---|---|---|---|---|---|---|
| | | | | 10 hrs. | 30 hrs. | 50 hrs. | 100 hrs. | 150 hrs. | 200 hrs. | | 10 hrs. | 30 hrs. | 50 hrs. | 100 hrs. | 150 hrs. | 200 hrs |
| Catalysts for use in purification under present invention: | | | | | | | | | | | | | | | | |
| 1 | None | *0 | >200 | 0 | 0 | 0 | 0 | 0.2 | 0.3 | >200 | 20 | 20 | 20 | 30 | 40 | 40 |
| 2 | Cu Powder | *20 | >200 | 0 | 0 | 0 | 0 | 0 | 0.2 | >200 | 20 | 20 | 20 | 20 | 20 | 20 |
| 3 | Fe Powder | *30 | >200 | 0 | 0 | 0 | 0 | 0.2 | 0.2 | >200 | 20 | 20 | 20 | 20 | 20 | 20 |
| 4 | $Bi_2O_3$ | *15 | >200 | 0 | 0 | 0 | 0 | 0 | 0 | >200 | 20 | 20 | 20 | 20 | 20 | 20 |
| Conventional CO oxidizer | | | 30 | 10 | 20 | | | | | 30 | 50 | 250 | | | | |

*Wt. Percent of the total wt. of manganese oxides and lead oxides.

EXAMPLE 4

Hereunder described are seven kinds of tests of the present invention wherein electrolytic manganese dioxide ($MnO_2$) selected as manganese oxides and bismuth sesquioxide ($Bi_2O_3$) selected as bismuth oxides were applied upon combining therewith at least one member selected from the group consisting of powders of metallic copper (Cu), metallic iron (Fe), carbonyl nickel (Ni), yttrium oxides ($Y_2O_3$) and iron oxides ($Fe_2O_3$) as third additives.

The present examples were conducted by employing the exhaust gas having CO concentration of 3% and HC concentration of 300 p.p.m. in terms of n-hexane, as shown in Table 4, which was exhausted from a 360 cc. water-cooled 4-cylinder gasoline engine using leaded gasoline, and confirming the purification effect of the present catalyst on the automobile exhaust gas. Secondary air was mixed to see that the ratio of CO concentration to $O_2$ concentration in this mixture was maintained in the range of 1:1–2. This gas mixture was inlet to a reaction vessel with 3 kg. (2.0 l.) of catalyst in the present invention prepared by combining the aforementioned components. The catalyst pieces were fabricated by special powder metallurgical technique, having high strength of 500–1,000 kg./cm.² at a normal temperature and porosity of 30% (in volume), and devised so that the gas may pass through freely. Each piece had a wavy surface to facilitate the contact with the above-said gas mixture and was assembled and packed in such a manner as to keep the back-pressure minimal. The reaction vessel was installed at a proper position of the exhaust channel of said gasoline engine so as to be capable of maintaining the temperature of the catalyst layer in the range of 350–500° C. to thereby perform the purification. The space velocity in this case was about 10,000/hr.

By applying the condition for treatment such that said exhaust gas was subjected to pass through the catalyst bed intermittently for 10 consecutive hours per day to be followed by 14-hour break and subsequent repetition of this cycle. The concentration of CO and that of HC in terms of n-hexane at both the inlet and outlet of said catalyst bed were analyzed by means of NDIR analyzer, and oxygen concentration was analyzed by means of gas chromatographic analyzer. The purification efficiency of the present catalysts with respect to CO and HC was compared to the one with conventional CO oxidizer for 200 hours under the foregoing condition for treatment.

As is clear from the result of purification tests shown in Table 4, the present catalyst proved to have a preeminent effect in purification of CO and HC contained in the automobile exhaust gas compared with the conventional CO oxidizer.

TABLE 4.—RESULTS OF PURIFICATION TESTS ON CO AND HC CONTAINED IN AUTOMOBILE EXHAUST GAS

Type of engine: 360 cc./water-cooled 4-cylinder gasoline engine (using leaded gasoline)—Composition of sample exhaust gas: CO 3%, $O_2$ 3–5%, $N_2$ 78%, $CO_2$ 10%, HC 300 p.p.m., others 4–6%—Temperature of catalyst layer: 350–500° C.

| Kind of treating agent | Composition of catalyst for use in purification under present invention (wt. ratio) | | | | | | | CO concentration of outlet gas from catalyst bed classified by duration of service (percent) | | | | HC concentration of outlet gas from catalyst bed classified by duration of service (p.p.m.) (in terms of n-hexane) | | | |
|---|---|---|---|---|---|---|---|---|---|---|---|---|---|---|---|
| | $MnO_2$ | $Bi_2O_3$ | Cu | Fe | Ni | $Y_2O_3$ | $Fe_2O_3$ | 30 hrs. | 50 hrs. | 100 hrs. | 200 hrs. | 30 hrs. | 50 hrs. | 100 hrs. | 200 hrs. |
| Catalyst for use in purification under present invention (applied amount=2.0 l.): | | | | | | | | | | | | | | | |
| 1 | 95 | 5 | 5 | | | | | 0.3 | 0.3 | 0.5 | 0.6 | 45 | 70 | 100 | 130 |
| 2 | 92 | 8 | | 10 | 5 | | | 0.2 | 0.3 | 0.5 | 0.5 | 40 | 60 | 80 | 120 |
| 3 | 90 | 10 | 5 | | 5 | | | 0.2 | 0.4 | 0.6 | 0.6 | 30 | 60 | 70 | 100 |
| 4 | 85 | 15 | 5 | 30 | 10 | | | 0.2 | 0.2 | 0.3 | 0.4 | 30 | 40 | 70 | 80 |
| 5 | 80 | 20 | | | | 5 | | 0.3 | 0.3 | 0.4 | 0.4 | 50 | 80 | 110 | 140 |
| 6 | 70 | 30 | 10 | 10 | | | 5 | 0.3 | 0.3 | 0.4 | 0.5 | 35 | 60 | 100 | 100 |
| 7 | 60 | 40 | | | 10 | | 10 | 0.2 | 0.3 | 0.3 | 0.3 | 40 | 70 | 110 | 120 |
| Conventional CO oxidizer (applied amount=2.0 l.) | | | | | | | | 1.8 | 3.0 | | | 150 | 200 | | |

EXAMPLE 5

Hereunder described five kinds of Japan's Federal 4-mode Test of the present invention wherein electrolytic manganese dioxide ($MnO_2$) selected as manganese oxides, trilead tetroxide ($Pb_3O_4$) selected as lead oxides and bismuth sesquioxide ($Bi_2O_3$) selected as bismuth oxides were applied upon combining therewith at least one member selected from the group consisting of powders of metallic copper (Cu), metallic iron (Fe), alumina ($Al_2O_3$), silica ($SiO_2$), carbonyl nickel (Ni), cerium oxides ($CeO_2$), yttrium oxides ($Y_2O_3$) and magnesium oxides (MgO) as third additives.

Tests in the present example were conducted by employing the exhaust gas obtained by running at 1,600 cc. gasoline engine by the use of leaded gasoline and repeating a 10 minute-idle followed by a 2,000 r.p.m. cruise for 140 minutes. This cycle was repeated with 5 consecutive hours' running and 1-hour break. The secondary air was introduced to the emission gas while running, and was served as the sample inlet gas.

The gasoline used in this case was a high octane leaded gasoline (97 RON).

A catalyst bed of 5.0 kg. (3.0 l.) of catalyst of the present invention was constructed into the form described in Example 4, and the catalyst vessel was installed 90 cm. apart from the exhaust manifold outlet. The secondary air was introduced into the vicinity of the exhaust manifold outlet. The space velocity in this case was in the range of 20,000–30,000/hr. The backpressure was about 10–15 mm. Hg at the cruising condition of 60 km./hr. The temperature of the catalyst bed was maintained in the range of 350–550° C. Both the inlet and outlet gases of the catalyst bed were analyzed with respect to carbon monoxide (CO) and hydrocarbons (HC) by means of NDIR analyzer. Oxygen concentration was analyzed by means of gas chromatographic analyzer. HC concentration was given in terms of n-hexane.

CO concentration of the inlet gas to the catalyst bed was 3–4% at the time of idling, and 0.3–0.6% at cruising time, and HC concentration was 200–300 p.p.m. A 150-hour catalytic purification test was performed under the abovementioned condition, to thereby examine the purification efficiency of the catalyst with respect to CO and HC in terms of n-hexane after 150-hour service on the basis of Japan's Federal 4-mode Test Procedure.

As is clear from the results in Table 5, the present catalyst proved to have an excellent purification efficiency with respect to CO and HC contained in automobile exhaust gas, which is as high as more than 500% of that of the conventional CO oxidizer.

(ii)
$$HC\ (g/mile) = \frac{HC\ ppm}{1,000,000} \times (1.8 \times 6) \times \frac{exhaust\ volume}{mile} \times 16.33\ g/ft^3$$

(iii)
$$\frac{exhaust\ volume}{mile} = (-6.00 + 0.0249\ W - 0.00000181\ W^2)$$

(iv)
$$W = 2,500\ lbs$$

What is claimed is:

1. A catalyst composition for oxidizing carbon monoxide in the exhaust gas from a combustion operation, consisting essentially of (a) manganese oxide selected from the group consisting of $Mn_2O_3$, $Mn_3O_4$, $MnO_2$ and mixtures thereof, and (b) bismuth oxide selected from the group consisting of $Bi_2O_3$, $Bi_2O_4$, $Bi_2O_5$ and mixtures thereof, the weight ratio of a:b being in the range of 95:5 to 50:50.

2. A catalyst composition according to Claim 1 in which the weight ratio of a:b is in the range of 90:10 to 70:30.

3. A catalyst composition for oxidizing carbon monoxide in the exhaust gas from a combustion operation, consisting essentially of (a) manganese oxide selected from the group consisting of $Mn_2O_3$, $Mn_3O_4$, $MnO_2$ and mixtures thereof, and (b) bismuth oxide selected from the group consisting of $Bi_2O_3$, $Bi_2O_4$, $Bi_2O_5$ and mixtures thereof, the weight ratio of a:b being in the range of 95:5 to 50:50 and (c) from 5 to 10% by weight, based on the sum of (a) plus (b), of material selected from the group consisting of alkaline earth metal oxides, rare earth oxides, aluminum oxide, silicon oxide, oxides of copper, iron, cobalt and nickel and mixtures thereof.

4. A catalyst composition for oxidizing carbon monoxide in the exhaust gas from a combustion operation, consisting essentially of (a) manganese oxide selected from the group consisting of $Mn_2O_3$, $Mn_3O_4$, $MnO_2$ and mixtures thereof, and (b) bismuth oxide selected from the group consisting of $Bi_2O_3$, $Bi_2O_4$, $Bi_2O_5$ and mixtures thereof, the weight ratio of a:b being in the range of 95:5 to 50:50 and (c) from 5 to 60% by weight, based on the sum of (a) plus (b), of transition metal selected from the group consisting of copper, iron, cobalt and nickel metal, and mixtures thereof.

5. A catalyst composition for oxidizing carbon monoxide in the exhaust gas from a combustion operation, consisting essentially of (a) manganese oxide selected from the group consisting of $Mn_2O_3$, $Mn_3O_4$, $MnO_2$ and mixtures thereof, (b) lead oxide selected from the group

TABLE 5.—CO AND HC PURIFICATION EFFICIENCY SHOWN BY THE PRESENT CATALYST

[150-hour tests with a 1,600 cc. engine dynamometer (Conventional CO oxidizer used as standard herein indicates the result of its application in 30-hour operation)]

| | | | Inlet gas | | Outlet gas | |
|---|---|---|---|---|---|---|
| | Composition of present catalyst (wt. ratio) | Item of measurement and calculation | CO (percent) | HC (p.p.m.) | CO (percent) | HC (p.p.m.) |
| Test number: | | | | | | |
| 1 | $MnO_2$ (75), $Pb_3O_4$ (25), $Bi_2O_3$ (40) | Mean exhaust concentration | 1.6 | 2.0 | 0.5 | 60 |
| | | Exhaust weight (g./mile) | 23.8 | 1.7 | 7.4 | 0.5 |
| 2 | $MnO_2$ (50), $Bi_2O_3$ (50), Cu (15), Ni (5) | Mean exhaust concentration | 1.6 | 210 | 0.4 | 50 |
| | | Exhaust weight (g./mile) | 23.8 | 1.7 | 6.0 | 0.4 |
| 3 | $MnO_2$ (80), $Bi_2O_3$ (20), Cu (5), Fe (10), $SiO_2$ (5). | Mean exhaust concentration | 1.6 | 210 | 0.6 | 50 |
| | | Exhaust weight (g./mile) | 23.8 | 1.7 | 8.9 | 0.4 |
| 4 | $MnO_2$ (90), $Bi_2O_3$ (10), Cu (5), $Al_2O_3$ (5), Ni (5), $Y_2O_3$ (5). | Mean exhaust concentration | 1.6 | 210 | 0.4 | 50 |
| | | Exhaust weight (g./mile) | 23.8 | 1.7 | 6.0 | 0.4 |
| 5 | $MnO_2$ (25), $Pb_3O_4$ (75), $BiO_3$ (5), Cu (5), Fe (5), Ni (5), $CeO_2$ (5). | Mean exhaust concentration | 1.6 | 210 | 0.5 | 60 |
| | | Exhaust weight (g./mile) | 23.8 | 1.7 | 7.4 | 0.5 |
| Conventional CO oxidizer [1] | | Mean exhaust concentration | 1.6 | 210 | 1.0 | 150 |
| | | Exhaust weight (g./mile) | 23.8 | 1.7 | 14.9 | 1.2 |

[1] Applied amount=3.0 l.; result of 30-hrs. application.

Conditions of the tests (1) Type of engine: 1,600 cc. engine dynamometer.
(2) Amount of present catalyst applied: 5 kg. (3,000 ml.).
(3) Amount of secondary air employed: 100 l./min.
(4) Position of catalyst vessel: about 90 cm. apart from the exhaust manifold outlet.
(5) Kind of gasoline used: high octane leaded gasoline (97 RON).
(6) Conditions of operation: [idling (10 min.)—cruise at 60 km./hr. (2,000 r.p.m.) (140 min.)]×2=5-hr. running—1-hr. break.
(7) Gas analysis: conducted by: non-dispersive infrared red (NDIR) analyzer; and gas chromatographic analyzer.
(8) Calculation of exhaust weight:

(i)
$$CO\ (g/mile) = \frac{CO\ percent}{100} \times \frac{exhaust\ volume}{mile} \times 33.11\ g/ft^3$$

consisting of PbO, $Pb_3O_4$, $PbO_2$, $Pb_2O_3$ and mixtures thereof, the weight ratio of $a:b$ being in the range of 75:25 to 25:75, and (c) from 5 to 40% by weight, based on the sum of (a) plus (b), of bismuth oxide material selected from the group consisting of $Bi_2O_3$, $Bi_2O_4$, $Bi_2O_5$ and mixtures thereof, or a transition metal selected from the group consisting of copper, iron, cobalt and nickel metal, and said bismuth oxide material.

6. A catalyst composition according to Claim 5, in which the weight ratio of $a:b$ is in the range of 60:40 to 40:60 and the amount of (c) is in the range of 5 to 30% by weight, based on the sum of (a) plus (b).

References Cited

UNITED STATES PATENTS

| Number | Date | Name | Class |
|---|---|---|---|
| 1,345,323 | 6/1920 | Frazer | 252—471 |
| 3,271,447 | 9/1966 | Naylor, Jr. | 252—471 X |
| 1,903,803 | 4/1933 | Barker | 252—471 |
| 3,207,704 | 9/1965 | Stephens et al. | 252—471 X |
| 3,493,325 | 2/1970 | Roth | 252—471 X |
| 1,971,168 | 8/1934 | Weiss | 252—471 X |
| 1,211,394 | 1/1917 | Bosch et al. | 252—471 |
| 2,288,943 | 7/1943 | Eastman | 252—471 X |
| 3,207,704 | 9/1965 | Stephens et al. | 252—471 X |
| 1,345,323 | 6/1920 | Frazer et al. | 423—213 |

CARL F. DEES, Primary Examiner

U.S. Cl. X.R.

252—462, 464, 471